United States Patent [19]

Wohlhaupter

[11] 4,300,271
[45] Nov. 17, 1981

[54] CLAMPING DEVICE FOR A SLIDING MOUNT

[75] Inventor: Gerhard Wohlhaupter, Frickenhausen, Fed. Rep. of Germany

[73] Assignee: Emil Wohlhaupter & Co., Frickenhausen, Fed. Rep. of Germany

[21] Appl. No.: 182,576

[22] Filed: Aug. 29, 1980

[30] Foreign Application Priority Data

Oct. 9, 1979 [DE] Fed. Rep. of Germany ....... 2940864

[51] Int. Cl.³ ............................................. F16C 17/00
[52] U.S. Cl. ..................................... 29/1 A; 308/3 A; 403/381; 403/373
[58] Field of Search ............... 403/381, 373, 331, 362, 403/290, 366; 308/3 A; 29/1 A

[56] References Cited

U.S. PATENT DOCUMENTS 2,506,958  5/1950  Hallenbeck .......................... 308/3 A
3,702,716  11/1972  Decker ................................ 308/3 A Primary Examiner—Andrew V. Kundrat
Attorney, Agent, or Firm—Shenier & O'Connor

[57] ABSTRACT

A clamping device for a sliding mount, particularly a dove-tail mount, in which a guide projecting from a slide clock is slidably mounted in a guide groove of a guide body. The clamping device includes a slot in the guide body extending parallel to the guide groove and defining a clamping part between the slot and the groove which can be pressed against the guide. A cavity, in which a bolt is located, is provided in the guide body such that the upper end of the bolt is within the unslotted part of the guide body and the lower end of the bolt is adjacent said clamping part. A clamping screw extends within a threaded bore in the body and is arranged to displace the bolt such that the lower end of the bolt presses against the clamping part whereby the slide block is clamped relative to the groove.

6 Claims, 6 Drawing Figures

CLAMPING DEVICE FOR A SLIDING MOUNT

BACKGROUND OF THE INVENTION

The invention relates to a clamping device for a sliding mount, particularly a dove-tail mount, in which a guide-projection, standing proud of a sliding block is slidably mounted in a guide groove of a guide body. The guide body has a slot extending parallel to the guide groove, and defining a clamping part, located between the slot and the guide groove, which can be pressed against the adjacent lateral surface of the guide-projection by means of at least one screw.

Known clamping devices have the disadvantage that the support-forces of the clamping screws are transmitted to the part of the sliding mount in which they are mounted, thereby giving rise to geometric changes in the guide body. Accordingly, other guide surfaces on the guide body can be deformed and this can, for example, cause jamming.

It is an object of the invention to design a clamping device which does not produce such deformations on clamping.

SUMMARY OF THE INVENTION

According to the invention there is provided in a sliding mount having a guide body provided with a guide groove, a slide block, and a guide projecting from said slide block and slidably mounted in said guide groove, a clamping device comprising a slot in the guide body extending parallel to said guide groove and defining a clamping part on the guide body between the slot and the groove, and at least one screw arranged to press the clamping part against said guide, the clamping device further comprising at least one cavity within the guide body, and a bolt located with a clearance within said cavity, one end of the bolt being within the unslotted part of the guide body and the other end of the bolt being adjacent said clamping part, wherein said screw extends within a threaded bore in said guide body such that when said screw is screwed into said bore it displaces said bolt such that said other end of said bolt presses against the clamping part.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
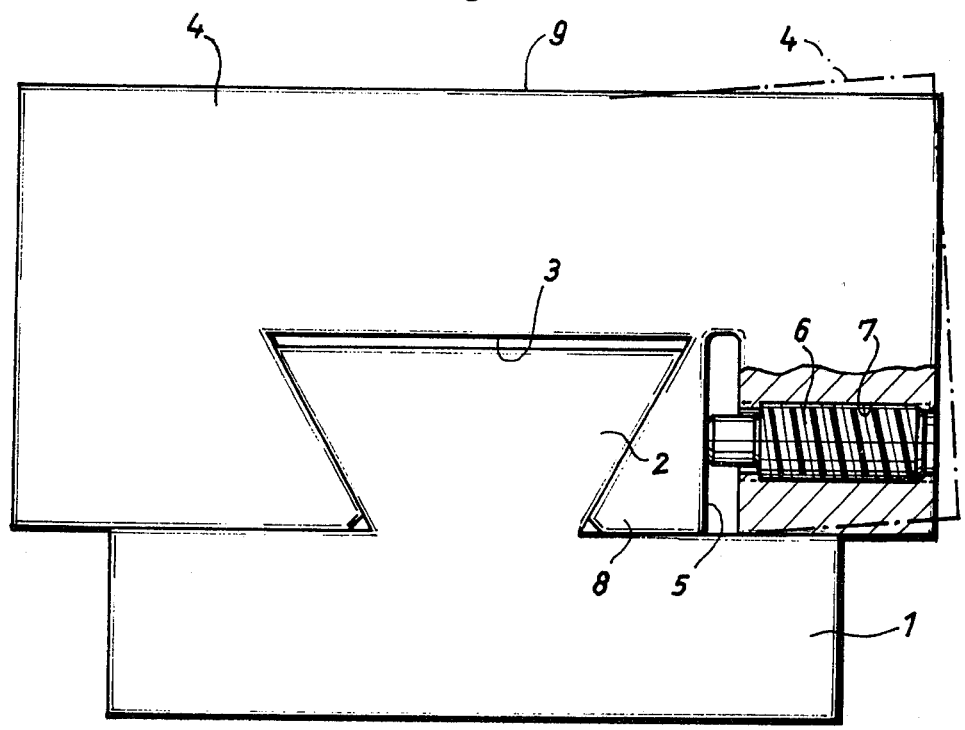
FIG. 1 shows a conventional device for clamping a sliding mount.
Figure 2:
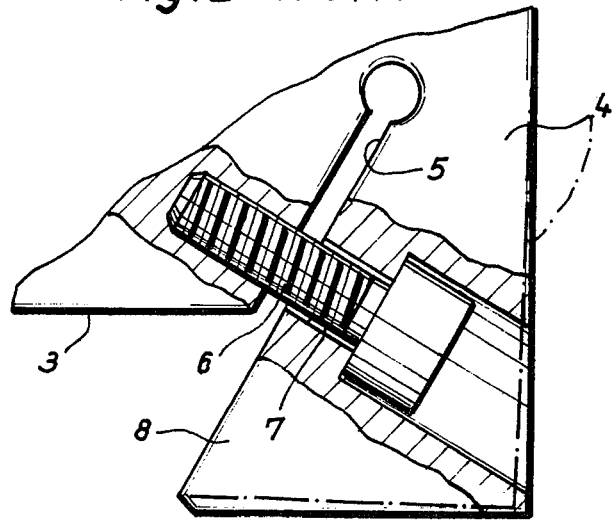
FIG. 2 shows another conventional clamping device.

FIGS. 1 and 2 show two types of conventional clamping devices on dove-tail mounts. In FIG. 1 a sliding block 1, having a dove-tail shaped guide-projection 2, standing proud of the block, is slidably mounted in a guide groove 3 of matching shape in a guide body 4. In the guide body 4, a slot 5 extends parallel to the dove-tail shaped guide groove 3. The slot 5 is traversed by the leading part of a cylindrical-headed screw 6 which is mounted in a threaded bore 7 in the guide body 4. By screwing in the screw 7 to an appropriate extent pressure is exerted on a clamping part 8 of the guide body 4, this clamping part being located between the slot 5 and the groove 3, so that this clamping part 8 is pressed against one of the side walls of the guide-projection 2 and thereby clamps the sliding block to the guide body. On tightening the screw 6, its support force is transmitted to the part of the guide body in which it is housed, and gives rise to a geometric deformation of the entire guide body, as indicated by the chain-dotted line in FIG. 1. If, for example, the upper surface 9 of the guide body is also designed as a sliding mount surface, the deformation shown will probably cause jamming.

In the conventional clamping device shown in FIG. 2 parts corresponding to those of FIG. 1 have the same reference numerals as in FIG. 1. On tightening the screw 6, the clamping part 8 in FIG. 2 is displaced towards the left, so that the external shape of the guide body 4 also alters in an undesired manner, as indicated by the chain-dotted lines.

Figure 3:
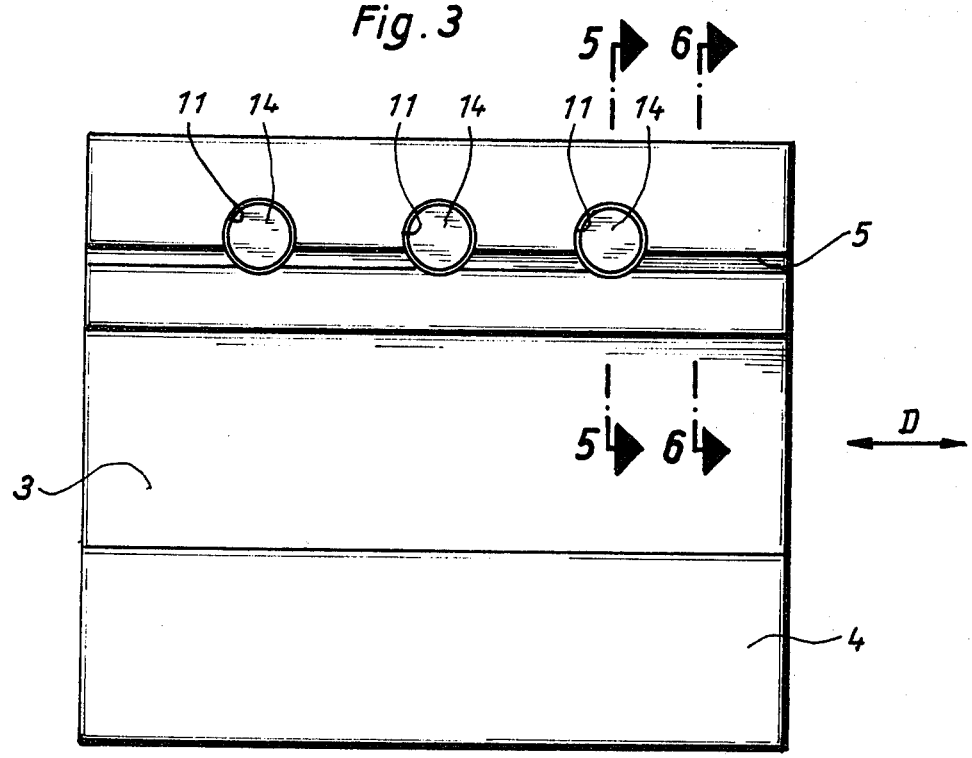
FIG. 3 shows a view from below of a device for clamping a sliding mount according to the invention with the sliding block removed.
Figure 4:
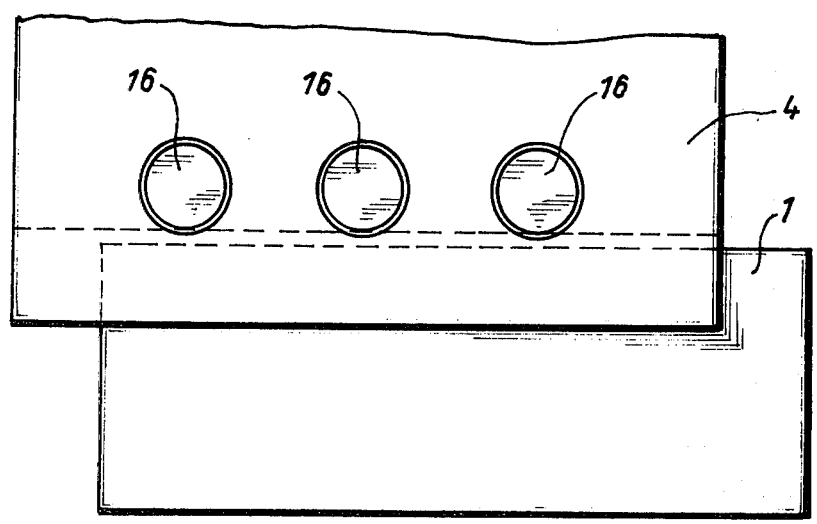
FIG. 4 shows a side view of the guide body of FIG. 3.
Figure 5:
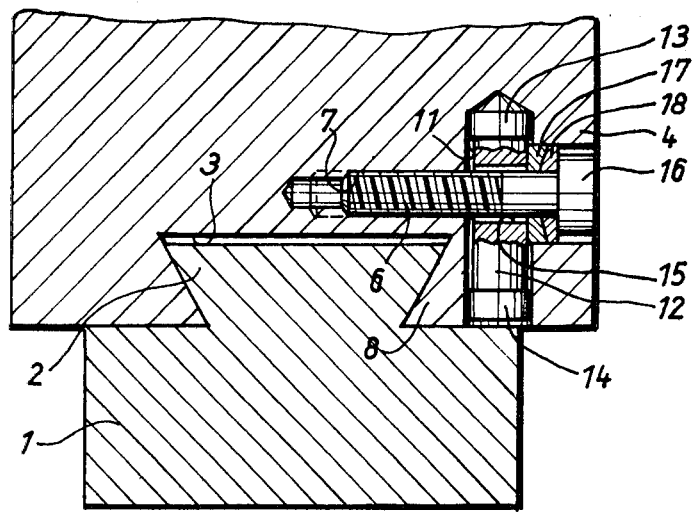
FIG. 5 shows a sectional view along the line 5—5 of FIG. 3.
Figure 6:
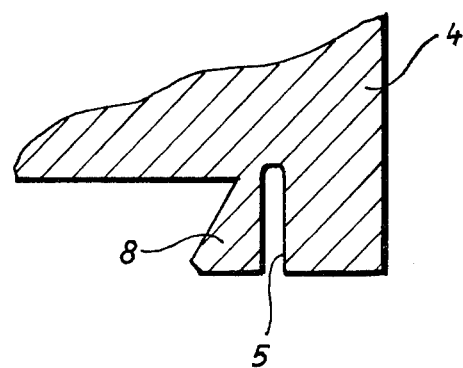
FIG. 6 shows a sectional view along the line 6—6 of FIG. 3.

An embodiment of a clamping device according to the invention is shown in FIGS. 3 to 6. In the device of the invention three cavities 11, in the form of bores extending parallel to the slot 5 and perpendicular to the direction of the displacement of the sliding block 1, are provided in the guide body 4. In FIG. 3, the direction of the sliding displacement of the block 1 is indicated by the double arrow D, and this direction is perpendicular to the plane of the drawing in FIG. 5. As is evident from FIG. 3, each of the cavities 11 extends somewhat beyond the slot 5. In each cavity 11 a bolt 12 is loosely housed, with a slight radial clearance. In the embodiment shown, each bolt 12 carries a collar 13, 14 of somewhat larger diameter than the rest of the bolt shaft, both at its upper and its lower end. These collars 13, 14 also have a small clearance relative to the inner wall of the cavity 11. Each of the bolts 12 possesses a transverse hole 15, in the radial direction, which is loosely traversed, a clearance being left free, by the screw 6, which is designed as a socket screw. The threaded bore 7, which receives the shaft of the screw 6, extends within the guide body 4 above the guide groove 3, parallel to the base of the guide groove 3, and perpendicular to the sliding displacement direction D of the sliding block 1. A concave spacer 17 and a domed washer 18 is located between the head 16 of the screw 6 and the bolt 12 by means of which pressure can be exerted on the bolt 12 by screwing the screw 6 into the threaded bore 7.

On screwing the screw 6 into the threaded bore 7 pressure is exerted by way of the concave spacer 17 and the domed washer 18 on the bolt 12, so that this bolt comes into contact, by way of the collars 13, 14, with the part of the inner wall of the cavity 11 located opposite to the head 16. At the same time, the lower collar 14 acts with a certain leverage-ratio on the clamping part 8 of the guide body 4 and presses this clamping part against the adjacent lateral surface of the dove-tail shaped guide-projection 2, thus clamping the sliding block 1 within the guide body 4.

Because the screw 6 is housed in a solid, unslotted, part of the guide body 4 and acts only in this part, it produces no deformations of the guide body as shown in FIGS. 1 and 2. This is the great advantage of the clamping device described. By means of the concave spacer 17 and the domed washer 18, provided between the bolt 12 and the screw head 16, the clamping forces are still transmitted to the clamping part 8 when the bolt 12 is tilted and extending at an angle, without jamming occurring. It is sufficient, in principle, to provide a single cavity 11 with a bolt 12 and a screw 6 in the clamping device described. However, an arrangement of at least two bolts 12, with associated screws 6 in the guide body 4, is to be preferred, since the guide body 4 and the sliding block 1 always possess a certain longitudinal extension. It is not absolutely necessary that the screws 6 pass completely through the bolts 12 in the cavities 11. In principle, the screws 6 could also extend past the bolts 12 to one side thereof, and be screwed into correspondingly displaced threaded bores 7. In this case, however, an additional pressure transmission member must be provided—analogous to the concave spacer 17 and the domed washer 18—by means of which the clamping force can be transmitted from the heads 16 of the screws 6 to the sides of the bolts 12.

I claim:

1. In a sliding mount having a guide body provided with a guide groove, a slide block, and a guide projecting from said slide block and slidably mounted in said guide groove, a clamping device comprising a slot in the guide body extending parallel to said guide groove and defining a clamping part on the guide body between the slot and the groove, and at least one screw arranged to press the clamping part against said guide, the clamping device further comprising at least one cavity within the guide body, and a bolt located with a clearance within said cavity, one end of the bolt being within the unslotted part of the guide body and the other end of the bolt being adjacent said clamping part, wherein said screw extends within a threaded bore in said guide body such that when said screw is screwed into said bore it displaces said bolt such that said other end of said bolt presses against the clamping part.

2. A clamping device according to claim 1, wherein the axes of said cavity and of said bolt extend transversely to the direction of displacement of the slide block and substantially parallel to said slot.

3. A clamping device according to claim 1, wherein a hole extends through the bolt and said screw extends through the hole.

4. A clamping device according to claim 1, further comprising a concave spacer and a domed washer located between the head of the screw and the bolt.

5. A clamping device according to claim 1, 2, 3 or 4, wherein a collar is provided on the one and/or on the other end of the bolt.

6. A clamping device according to claim 1, wherein three said cavities are provided in the guide body and a respective bolt is located in each cavity.

* * * * *